T. H. ARNOLD.
Horse Hay Fork.
No. 55,035.
Patented May 29, 1866.
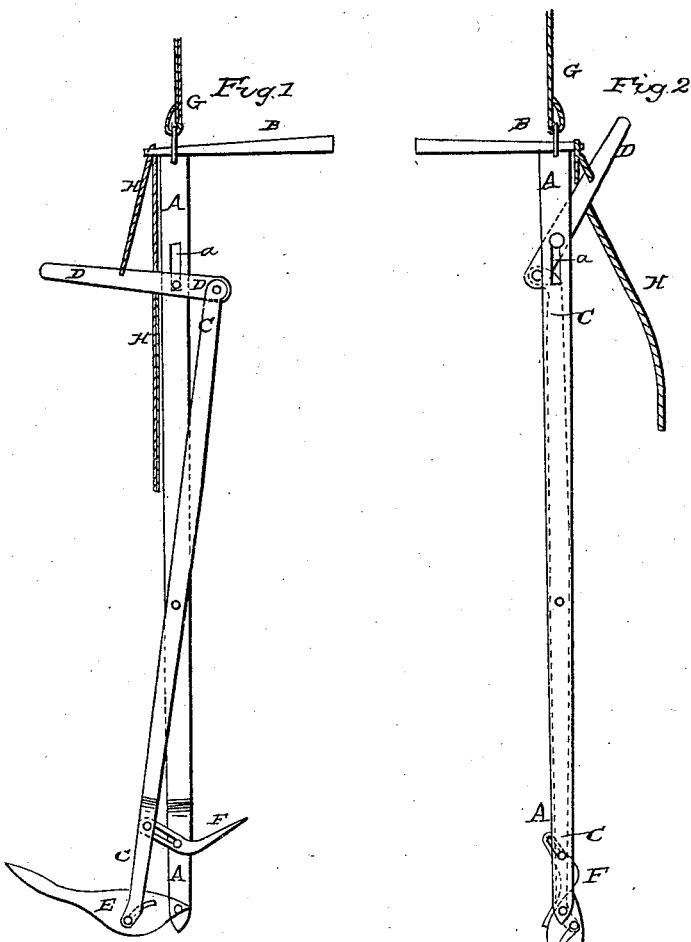

UNITED STATES PATENT OFFICE.

T. H. ARNOLD, OF TROY, PENNSYLVANIA.

IMPROVEMENT IN HORSE HAY-FORKS.

Specification forming part of Letters Patent No. 55,035, dated May 29, 1866.

*To all whom it may concern:*

Be it known that I, T. H. ARNOLD, of Troy, in the county of Bradford and State of Pennsylvania, have invented a new and useful Improvement in Horse Hay-Forks; and I do hereby declare that the following is a full, clear, and exact description thereof, which will enable others skilled in the art to make and use the same, reference being had to the accompanying drawings, forming a part of this specification, in which—

Figure 1 is a side view of my improved fork in position for raising a forkful of hay. Fig. 2 is a side view of the same in position for discharging its load.

Similar letters of reference indicate like parts.

My invention has for its object to furnish a horse hay-fork simple and strong in its construction and effective in its operation; and it consists of a fork constructed and operated as hereinafter more fully described.

A is a straight bar, having an arm or handle, B, attached to its upper end, as shown in the drawings. C is a straight bar somewhat shorter than the bar A. These bars are pivoted together near their centers, as seen in the drawings. The bars A and C are connected together at the upper end of the bar C by the lever D. The end of this lever is pivoted to the upper end of the bar C, as shown. It is also connected to the bar A by a pin working in a slot, *a*, in said bar. The effect of this lever is such that when its free end is raised the bars A and C are brought into a line with each other, as seen in Fig. 2. The hook or prong E is pivoted to the lower end of the bar A, and it is connected to the lower end of the bar C by a pin working in a curved slot in said hook or prong E. The hook or prong F is pivoted to the bar C, and is connected to the bar A by a pin working in a slot formed in said hook F. When the bars A and C are drawn into line with each other by raising the free end of the lever D, the hooks E and F take the position shown in Fig. 2, giving to the fork a form resembling a spear or harpoon, and when in this position it is readily thrust into the hay to any desired depth.

In using the fork the operator takes hold of the handle B and allows the fork to hang vertically. Then, by raising the free end of the lever D with his other hand, he brings the parts of the fork into the positions shown in Fig. 2. The fork is then thrust down into the hay nearly to the bottom of that part of the hay which it is desired to lift. Then, by gradually pushing down the free end of the lever D with one hand, while he pushes the fork down with the other, he brings the fork into the position shown in Fig. 1, in which position it remains, supporting the hay until the hay has been elevated to the required height and place by drawing upon the pulley-rope G, attached to the ring in the upper end of the fork. Then by drawing upon the rope H the free end of the lever D is raised, causing the fork to take the position shown in Fig. 2 and discharging the hay therefrom.

I claim as new and desire to secure by Letters Patent—

A horse hay-fork formed by combining the bars A and C, the lever D, and the prongs or hooks E and F, the parts being constructed and arranged substantially as described, and for the purpose set forth.

T. H. ARNOLD.

Witnesses:
B. S. TEARS,
M. W. PIERCE.